United States Patent [19]

Strussion

[11] Patent Number: 6,112,538
[45] Date of Patent: Sep. 5, 2000

[54] PORTABLE AIR CONDITIONING APPARATUS AND METHOD USING EVAPORATIVE COOLING

[75] Inventor: Tom Strussion, Bellaire, Ohio

[73] Assignee: Mist 'N Co, Inc., Bellaire, Ohio

[21] Appl. No.: 09/140,567

[22] Filed: Aug. 27, 1998

Related U.S. Application Data

[60] Provisional application No. 60/057,702, Aug. 27, 1997, and provisional application No. 60/083,548, Apr. 29, 1998.

[51] Int. Cl.[7] .................................................. F28D 5/00
[52] U.S. Cl. ............................. 62/304; 62/310; 62/314
[58] Field of Search ............................ 62/304, 310, 314

[56] References Cited

U.S. PATENT DOCUMENTS

| | | |
|---|---|---|
| 3,583,174 | 6/1971 | Logue . |
| 3,738,621 | 6/1973 | Anderson . |
| 3,813,696 | 6/1974 | Yeager ..................................... 2/171.3 |
| 4,213,306 | 7/1980 | Peabody et al. ............................ 62/85 |
| 4,360,368 | 11/1982 | Lyon . |
| 4,610,605 | 9/1986 | Hartley . |
| 4,658,597 | 4/1987 | Shum ..................................... 62/235.1 |
| 4,708,088 | 11/1987 | Purvis et al. . |
| 4,807,813 | 2/1989 | Coleman . |
| 4,934,155 | 6/1990 | Lowes ..................................... 62/197 |
| 5,005,367 | 4/1991 | Hwang . |
| 5,046,449 | 9/1991 | Nelson . |
| 5,112,535 | 5/1992 | Roberson . |
| 5,285,654 | 2/1994 | Ferdows . |
| 5,337,960 | 8/1994 | Allen . |
| 5,373,703 | 12/1994 | Pal . |
| 5,606,868 | 3/1997 | Calvert ..................................... 62/315 |
| 5,613,371 | 3/1997 | Nelson ..................................... 62/244 |

*Primary Examiner*—Henry Bennett
*Assistant Examiner*—Mark Shulman
*Attorney, Agent, or Firm*—Amin, Eschweiler & Turocy, LLP

[57] ABSTRACT

A portable evaporative cooling system includes a liquid storage tank, a pump coupled to the tank and a power source coupled to the pump. In addition, the system includes one or more nozzles coupled to the pump for converting a liquid to a relatively fine mist. The pump pumps the liquid from the tank to the one or more nozzles in a substantially non-pulsating manner, thereby providing a substantially continuous misting.

15 Claims, 5 Drawing Sheets

PORTABLE AIR CONDITIONING APPARATUS AND METHOD USING EVAPORATIVE COOLING

This application claims benefit to U.S. Provisional application Serial No. 60/057,702 filed Aug. 27, 1997, Provisional application Serial No. 60/083,548 filed Apr. 29, 1998.

FIELD OF THE INVENTION

The present invention generally relates to evaporative cooling equipment and more particularly relates to an apparatus and method for cooling individuals using a portable liquid mist system.

BACKGROUND OF THE INVENTION

In various work or leisure activities, it is often either crucial or highly desirable to employ some type of air conditioning means. In addition, since many of the above activities are away from one's work or business, it is desirable for the air conditioning means to be portable. In one common example, air conditioning units are used in automobiles or large, covered-cab agricultural machines. These air conditioning units are expensive and complex, often costing several hundreds of dollars to install and/or repair and utilize various components such as compressors, condensers, Freon or other coolant, etc. Although these air conditioning units work well, they are expensive and use a substantial amount of energy to operate as can be easily recognized by the poor gas milage one gets when driving with the air conditioner on. In addition, these cooling systems are employed primarily in closed surroundings such as in an enclosed cab of an automobile or agricultural machine. It is often desirable to provide cooling in open, unenclosed areas.

To address the need for cooling in open areas, fine mists of water have been used and released into the air substantially above the area to be cooled. The fine mist evaporates at it descends and provides a cooling of the air (evaporative cooling), thereby providing some measure of relief for individuals within the subject area. The fine mist is created by passing a liquid through a carrying tube and exiting through a nozzle such as the Cloudburst product manufactured by Mist & Cool, 1842 Washington Way, Suite B, Venice, Calif. 90291-4704. These systems however, are not substantially portable in that they are used to provide cooling for a party, wedding reception, etc. that involve many people. Consequently, the pumping mechanisms are large and require electrical connection to 110 volt AC line power. Consequently, the cooling system cannot readily be moved.

One prior art attempt to provide a portable evaporative cooling system is disclosed in U.S. Pat. No. 5,613,371 entitled, "Method and Apparatus for Misting Vehicle Occupants." The '371 patent integrates an evaporative cooling system into a golf cart having the fluid reservoir and other components integrated within the golf cart body. This prior art system, however, suffers from several drawbacks. One disadvantage of the '371 patent is the integration of the components within the golf cart. Since most golf resorts and country clubs do not own the golf carts, but rather lease them, the resorts and clubs are either not permitted or are extremely reticent to make physical alterations to the carts. In addition, the integration of the various components within a golf cart as an after-market product is a complicated and expensive installation process.

Yet another disadvantage of the system disclosed in the '371 patent is the use of an accumulator system and accompanying solenoid valve. The accumulator is a device which traps air to store energy for supplying water under a substantially constant pressure. The accumulator therefore is implemented to reduce the pulsing of fluid to the mist nozzles caused by the pump. The inclusion of an accumulator and accompanying solenoid further increases the cost and complexity of the system and provides a potential reliability problem since the accumulator reservoir is often an inflatable diagram which may puncture or leak during the rugged operation of the golf cart. Alternatively, the accumulator reservoir is a rigid tank which disadvantageously increases the size of the system, making it difficult to incorporate the system into various types or vehicles or applications.

Consequently, there is a need in the art for a portable, easy to install, inexpensive cooling system.

SUMMARY OF THE INVENTION

The present invention includes a portable, liquid based cooling system that operates on a portable power source. The invention includes a liquid storage tank and a liquid pump coupled to a portable power source, such as, for example, a battery. The system also includes a length of tubing or pipe to carry the pumped liquid to nozzles coupled to the tubing or pipe to release the liquid into the air in a fine mist. The liquid mist evaporates and cools the air, thereby providing an inexpensive, portable cooling system. The system of the present invention is portable in that the power source is not a 110 volt AC line source. The power source may include one or more solar panels to convert heat collected from the sun into electrical energy. Alternatively, the power source may be a 12 volt portable battery such as a car battery. Further, a power supply system may include a portable primary battery-type power source supplemented by the one or more solar panels or another secondary source. Consequently, the cooling system may be easily moved by a user or easily packaged on a vehicle such as, for example, a golf cart or a large piece of industrial or agricultural machinery.

According to one aspect of the present invention, the tubing that carries liquid from the storage tank to the nozzle is an insulative, flexible tubing that allows a user to configure the tubing to easily accommodate the cooling system to various applications. In addition, the nozzles may be adjustable to alter the mist droplet size exuded by the nozzle or its misting area, thereby allowing a user a substantial amount of flexibility to alter the cooling to one's personal taste.

According to another aspect of the present invention, an air-conditioned golf cart is disclosed, wherein the golf cart includes a portable, liquid based (such as water) cooling system. The cooling system includes an insulative storage tank for the preferably cool liquid and a pump for pumping the liquid through one or more tubes having nozzles. The nozzles are strategically located about a generally front portion of the cart and release a fine liquid mist into the air. The liquid then evaporates as it travels in the air and causes the air to cool at a region about the golfers within the cart. In addition, the cooling system is advantageously coupled to the 12 volt golf cart battery and therefore does not require another power source. The present invention is also similarly applicable to agricultural equipment and heavy industrial machinery that typically do not have enclosed cabs such as bulldozers, front end loaders, etc.

According to yet another aspect of the present invention, the cooling system includes a pump which provides fluid to the one or more nozzles in a substantially non-pulsating manner. Therefore the present invention eliminates the need for an accumulator and solenoid, thus greatly simplifying the complexity and reducing the cost of the system over the prior art. According to a preferred embodiment of the present invention, the pump operates in a substantially non-pulsating mode by use of a bypass valve associated with the pump. The bypass valve operates to pass fluid from the pump inlet to the pump outlet when the outlet pressure increases above a predetermined level, thus maintaining the outlet fluid pressure relatively constant.

According to still another aspect of the present invention, the portable air-cooling system is packaged in a simple manner. The system includes a fluid tank configured to easily fit in a back portion of the golf cart which allows the system to be provided as an after-market add-on without requiring any modification to the golf cart. The tank contains an attachment strap for securing the tank to metal braces on both sides of a golf cart basket or golf club holder assembly. Alternatively, the attachment strap may be laced through a utility basket for easily attachment to the golf cart. The attachment strap includes a length adjustment means for easily tightening the strap and includes a clip at the appropriate ends to easily lock the tank in place, thereby greatly simplifying the installation of the cooling system over the prior art.

According to another aspect of the present invention a portable air-conditioned shower tower is disclosed, wherein the tower includes a portable, liquid based (such as water) cooling system. The cooling system includes an insulative storage tank for the preferably cool liquid and a pump for pumping the liquid through one or more tubes having nozzles. The nozzles are strategically located about a generally top portion of the tower and release a fine liquid mist into the air. The liquid then evaporates as it descends and causes the air to cool in a vicinity of the one or more users. The shower tower is advantageously coupled to a portable power source such as a 12 volt car battery and/or solar panel arrangement and therefore does not require connection to a 110 volt AC line voltage source. Consequently, the shower tower is portable, thereby greatly expanding its applicability such as use at driving ranges, tennis courts, playgrounds, and numerous other outdoor activities.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

The present invention will now be described with reference to the drawings wherein like reference numerals are used to refer to like elements throughout. The present invention relates to a portable evaporative cooling system which is inexpensive and easy to install as an after-market product. Therefore the evaporative cooling system of the present invention easily and conveniently operates in conjunction with vehicles or equipment to thereby provide inexpensive and environmentally friendly air conditioning.

The present invention includes a liquid tank or reservoir coupled to a pump. The pump is coupled to a power source and to one or more nozzles which emit the liquid in a relatively fine mist. The pump operates to pump the liquid from the tank to the nozzles in a relatively non-pulsating manner, thereby providing a substantially continuous supply of liquid to the nozzles to effectuate the evaporative cooling. According to one embodiment of the present invention, the pump provides the relatively continuous pumping action through a bypass valve, thus eliminating the need for costly and complex accumulators and associated equipment.

Figure 1:
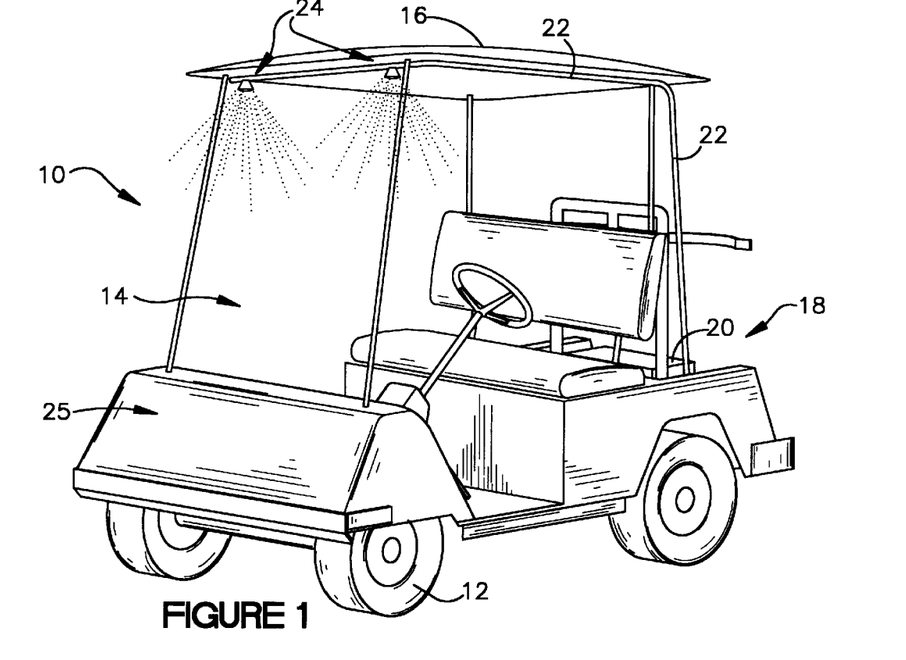
FIG. 1 is a perspective view of a golf cart employing an evaporative cooling system in an exemplary environmental context according to the present invention.

The present invention may be utilized in numerous applications such as in open cabin vehicles (e.g., golf carts, industrial or agricultural equipment) or in difficult to access areas where AC line power from the power company is not available such as picnic areas, local, state and national parks, driving ranges, tennis courts, playgrounds, etc. The present invention according to an exemplary embodiment is illustrated in FIG. 1 which illustrates an air-conditioned golf cart 10. The golf cart 10 is of the common type, having wheels 12, a cabin area 14 for sitting, a canopy or roof 16 and a back storage area 18, typically for storage of one's clubs, etc. The golf cart 10 includes a portable, liquid based evaporative cooling system 20 which is preferably located on or under the back storage area 18 of the golf cart 10. Alternatively, however, the cooling system 20 may be located elsewhere such as in a secured, protective basin or underneath the body of the golf cart 10 so as to be out of view and not interfere with one's clubs, etc.

Figure 2:
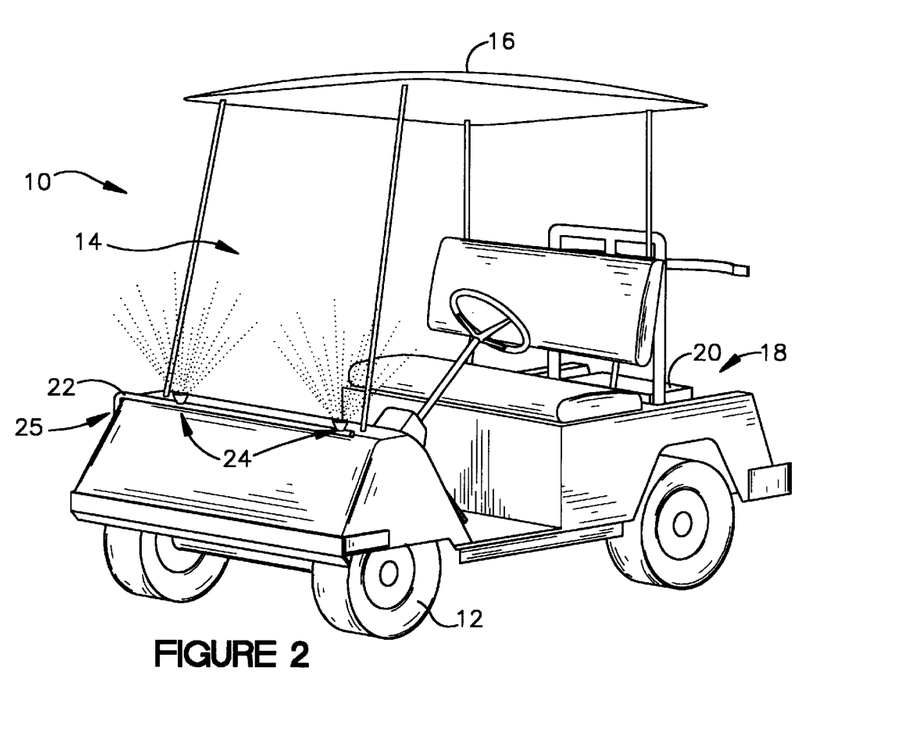
FIG. 2 is a perspective view of a golf cart employing an evaporative cooling system in an exemplary environmental context according to the present invention.

The cooling system 20 of FIG. 1 includes a water tank and pump (only partially shown in the back storage area 18) that pumps cool liquid (preferably water) through tubes 22 to one or more nozzles 24 located generally above the cabin area 14 as illustrated in FIG. 1, or alternatively on the front dashboard area 25 of the golf cart, as illustrated in FIG. 2. Preferably, the cooling system 20 has a control switch conveniently located to allow a golf cart occupant to turn the cooling system 20 on and off as desired. In addition, the nozzles 24 are preferably adjustable to thereby allow an occupant to alter the direction in which the liquid mist is released and/or alter the liquid mist droplet size to thereby provide substantial flexibility to account for wind, humidity and one's personal, subjective tastes.

The tube 22 is preferably a flexible, insulative tube to allow for easy accommodation with the cart 10. The flexible tube 22 may be bent, twisted, or otherwise configured to accommodate various types and styles of golf cart. The golf cart 10 of FIG. 1 is illustrated having one tube 22, however it should be understood that multiple tubes may be utilized as may be desired. The tube 22 is preferably attached to the canopy 16 or front dashboard area 25 of the golf cart 10 with attachment brackets or any other common attachment means. Alternatively, the tube 22 may have two-sided tape along a portion of its length to easily attach to the golf cart after removal of a release line (or backing).

As illustrated in FIG. 2, the nozzles 24 may be positioned on the front dashboard area 25 of the cart 10. In such case, the tube 22 may be run under the bottom or along the side of the cart 10 without substantially interfering with the operational or aesthetic aspects of the cart 10.

Figure 3:
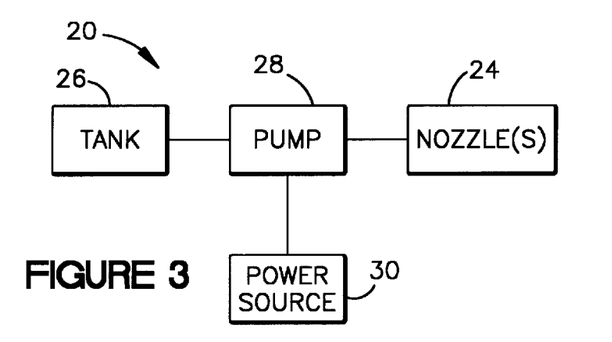
FIG. 3 is a block diagram illustrating components that comprise the evaporative cooling system according to the present invention.

FIG. 3 is a block level diagram that illustrates the basic components of the cooling system 20. The system 20 includes a liquid storage tank 26 is coupled to a water pump 28 which is powered by a power source 30. The water pump 28 is operable to pump the liquid from the storage tank 26 to the one or more nozzles 24.

Figure 4:
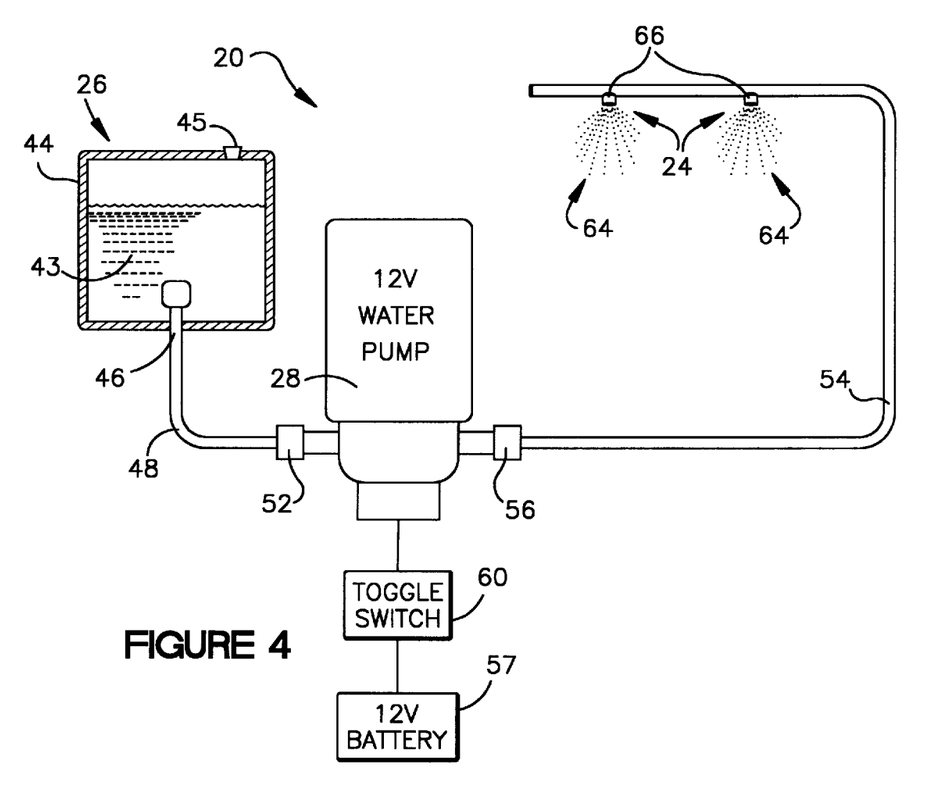
FIG. 4 is a diagram illustrating the evaporative cooling system according to the present invention.

The invention is further illustrated in greater detail in FIG. 4, namely a portable, liquid based evaporative cooling system 20. The system 20 includes the container, tank or reservoir 26 for storing a cool liquid, preferably water. The container 26 is preferably an insulative material 44 to keep the liquid therein cool. The insulative material may be the container walls itself or may further include, for example, an insulating rubber or insulative foam boot. Alternatively, any type of insulative material is contemplated by the present invention. In order to keep the liquid such as water cool as preferred, ice may be added to the liquid within the container 26, as may be desired. In addition, to avoid bacterial build-up within the tank 26, a small portion of household bleach may be added (e.g., about 1 teaspoon bleach to about 1 gallon of water/liquid) The container 26 also contains a plug or filler cap 45 for allowing liquid to be added or removed from the container 26 when the filler cap 45 is removed. The container 26 also includes an exit port 46 in which the fluid is drawn into a pump inlet tube 48 by a pump 28. Preferably, the tube 48 at its end inside the container 42 contains a filtering means such as a screen to prevent contaminants from entering the pump inlet tube 48 and interfering with the operation of the pump 50 or the nozzles 24.

The pump 28 is preferably a 12 volt portable water pump that is operable to pump the liquid from the container 26 to the nozzles 24 at a pressure of about 40 PSI or more. More preferably the pump 28 is sufficiently high-powered to pump the fluid at about 60 PSI. The pump 28 receives the fluid from the tube 48 at an inlet port containing the filtering means (not shown) and pumps the fluid into an output tube 54 (corresponding to the tube 22 of FIGS. 1 and 2) at an outlet port 56. One exemplary pump is a 12 V, 4-7 A, 800 Series Shur-Flo pump that is commercially available through Northern Arizona Wind and Sun, Inc., P.O. Box 125, Tolleson, Ariz. 85353. The pump 28 is preferably powered by a 12 volt portable battery 57 such as those commonly utilized in golf carts. The pump 28 is preferably a DC pump in order to easily accommodate the easily accessible DC battery which powers the cart 10 and most other portable pieces of equipment. Alternatively, however, the present invention may be utilized in an AC system in which case the pump 28 may be an AC pump. In yet another alternative embodiment of the present invention, a rectification circuit may be employed in conjunction with a DC pump for use in an AC system, as may be desired.

Figure 5:
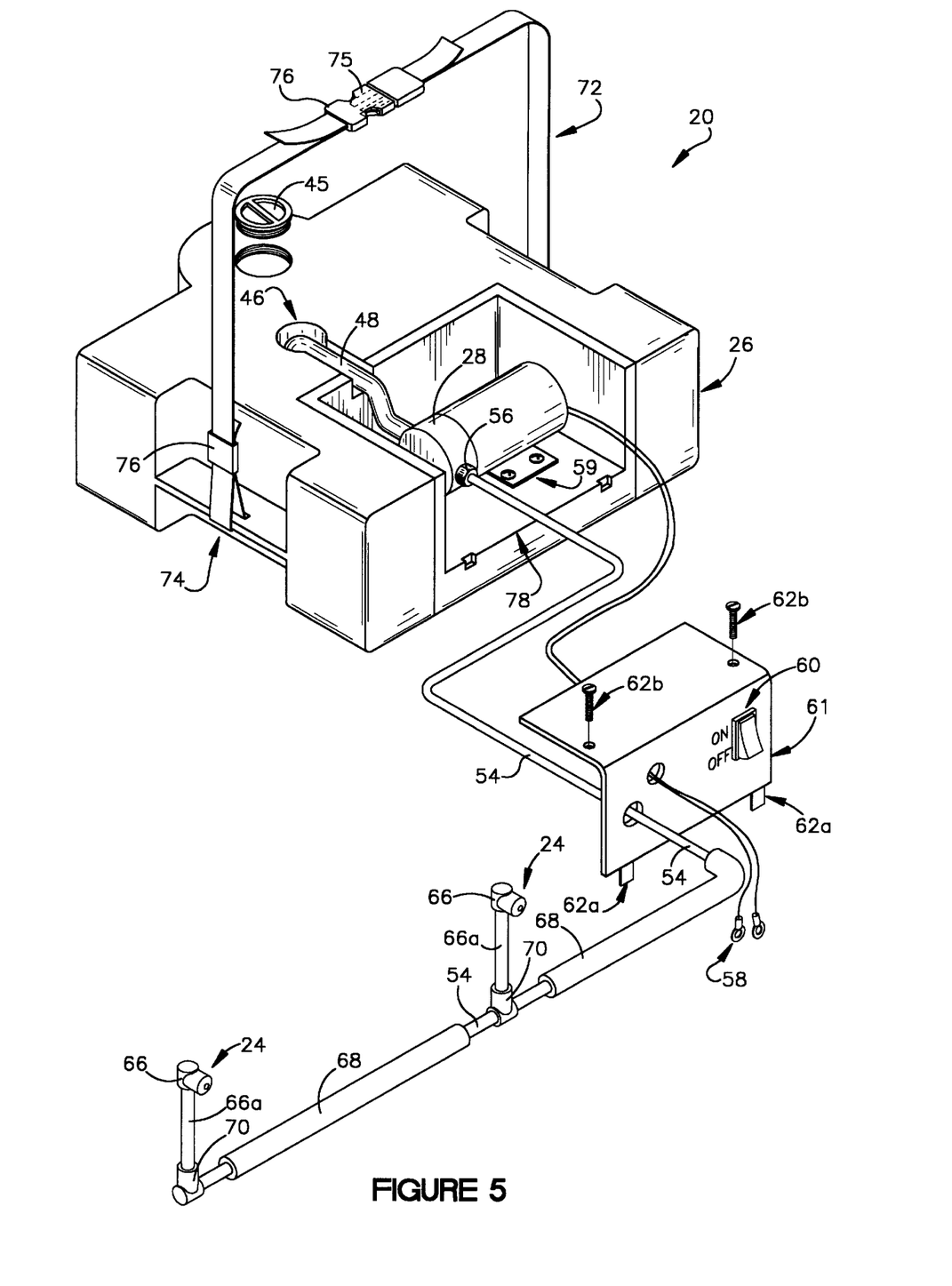
FIG. 5 is a perspective, partially exploded view illustrating the evaporative cooling system detached from its contextual deployment to thereby illustrate in greater detail the various components of the system according to the present invention.

The system 20 of FIG. 4 is illustrated in greater detail in FIG. 5. In FIG. 5, the system 20 as discussed above in conjunction with FIG. 4 is illustrated, wherein the means by which power is provided to the pump 28 is illustrated with electrical wires and connectors 58 which are preferably secured to the container 26 via a pump bracket 59. The battery (not shown in FIG. 5) selectively provides electrical power to the pump 28 via a toggle switch 60. The toggle switch 60 may be easily integrated within a control panel in the cabin portion 14 of the golf cart 10 but preferably is local to the pump 28 on a protective pump cover 61 which mates with the container 26 with snaps 62a and/or screws 62b for turning the system 20 on and off as desired. Preferably, the pump 28 operates at a single pump pressure, however, alternative embodiments of the present invention contemplate a variable power pump to vary the intensity of the liquid mist emission.

When the toggle switch 60 is toggled in the "ON" position, the system 20 is operational. The pump 28 pumps the fluid (again, preferably water) from the container 26 and tube 48 into the output tube 54, preferably at about 60 PSI, and into one or more nozzles 24. The nozzles 24 convert the liquid into a fine mist which provides an evaporative cooling effect, as is well known by those skilled in the art. The nozzles 24 are preferably removable to allow for easy replacement or nozzle cleaning. Consequently, the tube 54 preferably has sockets 66 which allow the nozzles 24 to easily attach and be easily replaced. The nozzles 24 may screw into the sockets 66 or may be locked into place via any known attachment and/or locking mechanism. The nozzles 24 may be replaced with other nozzles that provide different mist droplet size or emission areas as desired. Alternatively, the nozzles 24 are variable and allow a user to alter the liquid mist droplet size to account for varying humidity or wind conditions, etc. and to also vary the emission area (a narrow mist stream or a wide mist stream).

In another alternative embodiment of the present invention, the sockets 66 may directly engage the nozzles 24 in a rigid fashion or may alternatively have a stem portion 66a which is flexible to adjust the position of the nozzles 24 and thereby allow a user to manipulate the liquid mist emission direction by simply bending the flexible, directional connectors 66a into their desired positions.

The outlet tube 54 is preferably fed through a protective foam or conduit 68 having an adhesive means for attaching to the golf cart 10. Preferably, the adhesive means is a two-sided adhesive tape, however, glue, brackets or adjustable plastic ties are also contemplated as falling within the scope of the present invention. The outlet tube 54 may be segmented into two or more pieces to accommodate multiple nozzles 24 at various locations as may be desired, as illustrated in FIG. 5. Preferably, such accommodation is provided by "T" type fittings 70 as shown.

Figure 6:
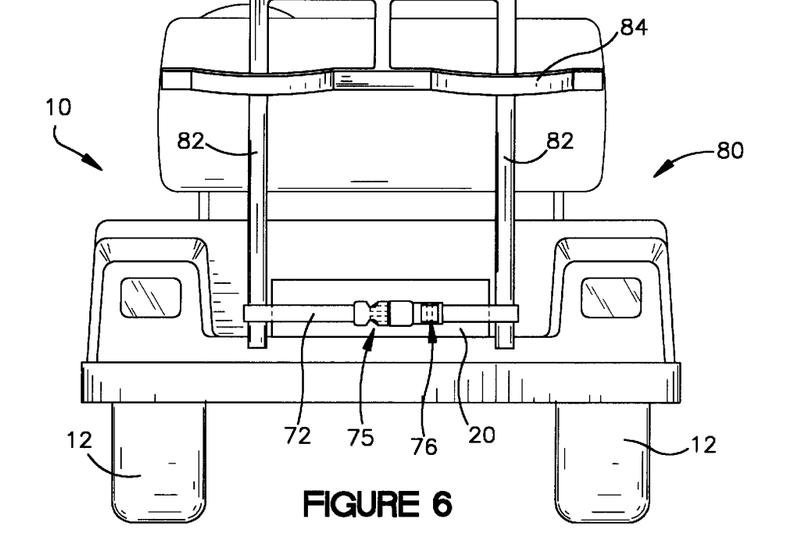
FIG. 6 is a back view of a golf cart illustrating the evaporative cooling reservoir mounted to the cart according to the present invention.

The system 20 of FIG. 5 also includes an attachment strap 72 which connects to the container 26 via a plurality of slots 74 on side portions of the container 42 to the golf cart 10. The attachment strap 72 includes a male/female clip 75 (preferably made of plastic) that snaps together. The attachment strap 72 also includes an adjustment means 76 for adjusting the length of the strap 76 to thereby allow for the container 26 to be secured to the cart 10. Preferably, the system 20 is slid into the back portion of the cart 10 under the club holder 80, as illustrated in FIG. 6. The system 20 is then easily secured to the cart 10 by placing the attachment strap 72 around the metal braces 82 which support the club assembly 84 or alternatively by lacing the strap 72 through a utility basket which are often utilized on such carts or other pieces of equipment. The system 20 is then locked into place by snapping together the male/female clip 75 and pulling the ends of the strap 72 to tighten the strap via the adjustment means 76.

Returning to FIG. 5, the system 20 of FIG. 5 also advantageously integrates the pump 28 with the container 26. The container 26 is preferably a molded plastic container having a molded recess 78 to accommodate the pump 28, however, other container materials may also be utilized. The recess 78 contains holes, a snap-bracket or any other appropriate attachment mechanism to either mount or engage the pump bracket 59 and thereby secure the pump 28 to the container 26. Preferably, the cover 61 then is placed over the recess 78 to protect the pump 28 as well as provide an aesthetic appeal. Integrating the pump 28 and the container 26 into one piece as illustrated in FIG. 5 is highly advantageous since it greatly decreases the system "footprint", thereby allowing the system 20 is easily fit under the cart basket or club holder 84 on the back of a golf cart 10, as illustrated in FIG. 6. According to a preferred embodiment of the invention, the integrated pump/container assembly feature provides for a system 20 that easily fits on the cart without interfering with one's golf equipment while providing at least about four (4) gallons of liquid storage in the container 26, which provides for more than four (4) hours of continuous misting without having to replenish the system 20 with additional liquid during a normal round of golf.

Figures 7A, 7B:
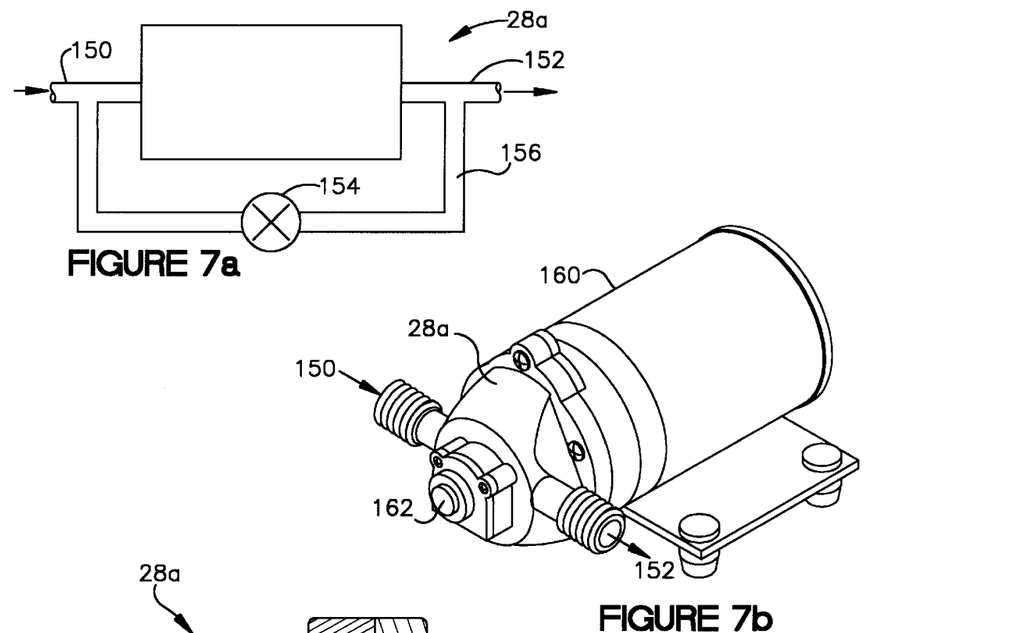
FIGS. 7a–7c are diagrams illustrating in greater detail the pump according to the present invention.

A pump 28a according to one embodiment of the present invention is illustrated in FIG. 7a. The pump 28a has an inlet 150 and an outlet 152, wherein a fluid pressure at the outlet is greater than at the inlet 150. The pump 28a also includes a bypass valve 154 in an external bypass path 156. Alternatively, however, the bypass valve 154 may be located internally within the pump 28a. The pump 28a is preferably a multi-chambered pump which distributes the fluid at the inlet 150 in, for example, three separate chambers and sequentially pumps the fluid from the chambers to the outlet 152 per stroke of the pump 28a. The pump 28a has an automatic shut-off at a predetermined outlet pump pressure (e.g., about 80–100 PSI) which causes the pump 28a to turn off when a pressure in the pump 28a exceeds the predetermined level. Since the pump 28a is capable of providing about 300 PSI before its motor stops, and the pump 28a is driving the nozzles 24 which have a modest flow rate of, for example, about 0.5–0.75 gallon/hour, the pressure at the outlet 152 increases, causing the pump 28a to turn off when the predetermined shut-off pressure threshold is reached. After the pressure at the outlet 152 decreases, the pump 28a automatically turns back on. Macroscopically then, the fluid at the outlet 152 appears to be pulsating which is undesirable. The bypass valve 154 operates to substantially reduce or eliminate the pulsing at the outlet 152 in the following manner.

The bypass valve 154 has a threshold bypass pressure which is preferably less than the desired operating fluid pressure (e.g., about 45 PSI). As the pressure at the outlet 152 increases toward the cut-off pressure, the threshold bypass pressure threshold is reached, at which time the bypass valve 154 opens and provides a direct fluid flow path from the inlet 150 to the outlet 152 via the bypass path 156. The bypass valve 154 is preferably designed to fully open at the desired operating fluid pressure (e.g., about 60 PSI) at which point the fluid provided to the nozzles 24 is provided primarily through the bypass valve 154 while the fluid within the pump 28a recirculates internally. Because the fluid flow is through the bypass valve 154, the cut-off pressure is not reached and the pump 28a no longer automatically turns on and off in a periodic manner. Thus the pulsation at the outlet 152 is reduced or eliminated altogether.

Figure 7C:
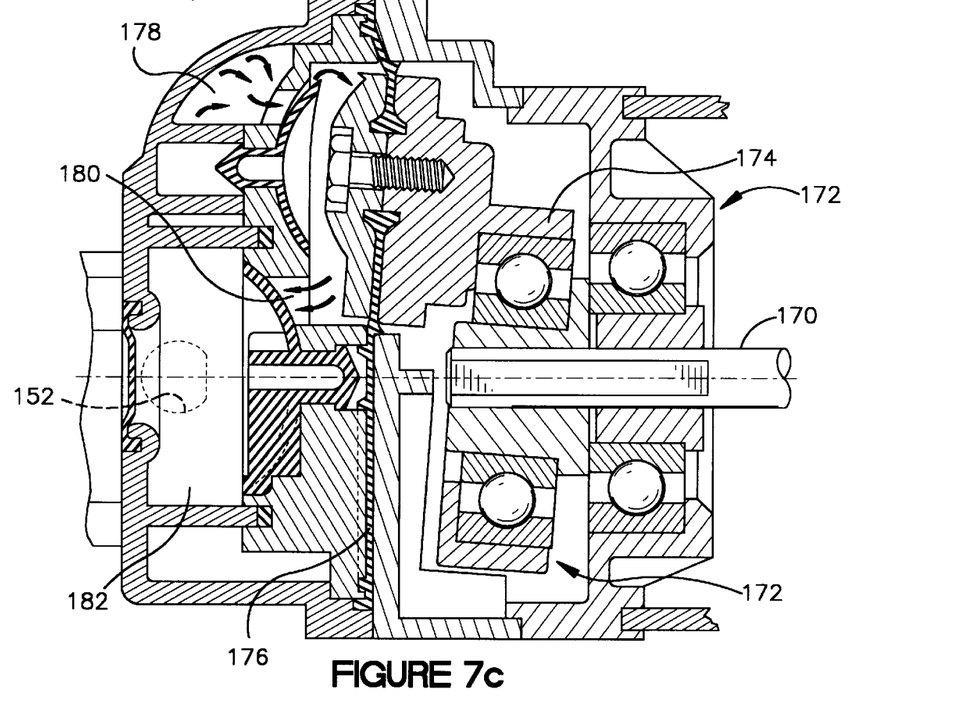

FIGS. 7b and 7c are a perspective view and a cross section view of an exemplary pump 28a according to the present invention. Such a pump 28a is described in a substantial amount of detail in, for example, U.S. Pat. No. 4,610,605 entitled "Triple Discharge Pump" which is incorporated by reference herein in its entirety. The pump 28a of FIG. 7b includes the inlet 150 and the outlet 152. The pump 28a is driven by a motor 160 which is controlled by a pressure switch 162 to activate and deactivate the motor 160 based on the pressure at the outlet 152, as described above in conjunction with FIG. 7a. A bypass valve (not shown) is located internally within the pump 28a between the inlet and the outlet 152 such that when the bypass valve is closed, the pump 28a operates in a non-bypass mode and the fluid passes from the inlet to the outlet through the three chambers. When the bypass valve is open, a leak exists between the inlet 150 and the outlet 152 and fluid passes therethrough.

The pump 28a, according to an exemplary embodiment of the present invention, is illustrated in greater detail in FIG. 8c. The pump 28a is a three chambered pump which is driven by an output shaft 170 of the motor 160. The pump 28a has three internal inlet valves and one common outlet valve and the valves are positioned to check one another when in operation. The pump 28a creates a void in each chamber by means of a pair of bearings 172 and a wobbler assembly 174 that nutates with the shaft 170 which flexes a diaphragm 176 to create a void in one of the inlet chambers 178. Atmospheric pressure then pushes fluid into the inlet chamber 178 and the inlet valve associated with the chamber 178 closes; the fluid is trapped until the wobbler assembly 174 nutates which in turn forces the fluid into an outlet chamber 180 and then into a common outlet chamber 182. This occurs separately in three chambers per one rotation of a shaft 170 driven by the motor 160.

According to the present invention, a bypass valve (not shown) is utilized in the pump of FIG. 8c. In such an exemplary arrangement, the outlet valve hole for each chamber leading to the common outlet chamber 182 is sealed with a poppet which is held in place by a spring. The force or spring rate of the spring thus determines the bypass pressure at which the bypass valve opens. The bypass valve is activated by the outlet pressure. When the outlet pressure matches the spring force, the poppet begins to lift off its seat, thus providing a direct leak between the inlet 150 and the outlet 152 of the pump 28a. When the bypass valve is utilized, the pressure switch 162 of FIG. 8b is not activated to turn the pump off and the fluid is provided to the outlet 152 in a substantially continuous, non-pulsating manner. Thus the pump 28a of the present invention greatly simplifies and reduces the cost of the cooling system by eliminating a need for an accumulator.

In another alternative embodiment of the present invention, the 12 volt battery may be supplemented or replaced by a solar panel array that may be affixed to the canopy or roof 16 of the golf cart 10 of FIGS. 1 and 2.

Although the preferred embodiment of the present invention contemplates use of the system 20 in golf, the present invention may also be utilized in a plurality of other uses, such as golf carts for other uses, industrial and construction machinery, agricultural machines, etc. Each of the above uses, as well as other uses, are contemplated as falling within the scope of the present invention.

Figure 8:
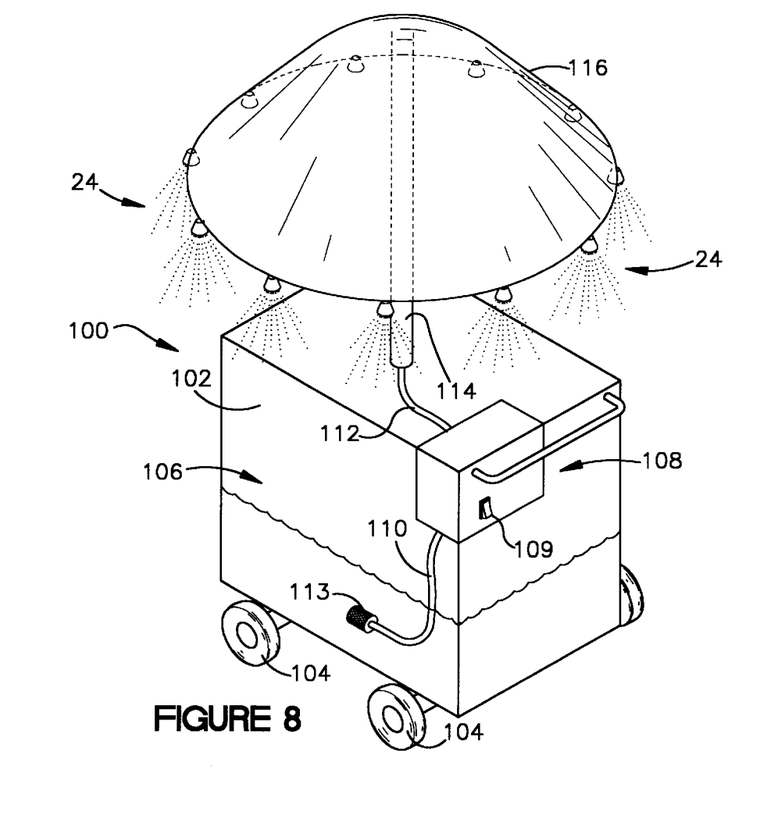
FIG. 8 is a perspective view of a portable cart employing a cooling system according to another embodiment of the present invention.

Another embodiment of the present invention is a portable cooling system 100 (or shower tower) as illustrated in FIG. 8. The system 100 includes a movable cart 102 having means for moving the cart 102, such as wheels 104. The cart 102 contains a large liquid storage tank 106, for example, a 30 gallon tank. The cart 102 also includes a storage compartment 108 for storing a power source and a pump (not shown). A toggle switch 109 exists on the outside of the cart 102 for turning the pump on and off as desired. An inlet tube 110 extends from a bottom portion of the tank 106 to the pump in the storage compartment 108 and a pump outlet tube 112 extends from the pump to a support post 114. The inlet tube 110 preferably has a filter 113 which prevents particulate contamination from entering the tube 110.

The support post 114 supports an umbrella or canopy 116 which, for example, provides shade and contains a plurality of nozzles 24 which provide a fine liquid mist to effectuate evaporative cooling. Preferably one or more solar panels (not shown) reside on top of the canopy 116 and convert the heat from the sun into useable electrical energy to either supplement the battery or even replace the battery. The support post 114 also houses additional tubing 112 therein (not shown) which delivers the liquid from the pump to the nozzles 24. The post 114 also preferably houses electrical wires for delivering electrical energy generated by the solar panels down to the power source which is preferably a rechargeable power source to provide supplemental power. The canopy 116 is preferably an umbrella shaped covering, however, other canopies may be utilized such as a palm tree top, a roof structure, etc. The system 100 provides effective evaporative cooling to remote areas such as on playgrounds, tennis courts, driving ranges, picnics, state or national parts, etc.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired.

What is claimed is:

1. A portable evaporative cooling system, comprising:

a liquid storage tank;

a pump coupled to the tank;

a power source coupled to the pump; and one or more nozzles coupled to the pump for converting a liquid to a relatively fine mist, wherein the pump pumps liquid from the tank to the one or more nozzles in a substantially non-pulsating manner, and wherein the pump includes a bypass valve coupled between an inlet and an outlet of the pump, wherein the bypass valve provides a leak between the inlet and the outlet when a pressure at the pump outlet exceeds a predetermined level, thereby preventing the pump from turning off due to reaching of a cut-off pressure and maintaining the pressure at the outlet substantially constant.

2. A portable evaporative cooling kit, comprising:

a liquid storage tank;

a pump coupled to the tank; and one or more nozzles coupled to the pump, wherein the pump is operable to pump liquid from the tank to the one or more nozzles in a substantially non-pulsating manner, and wherein the pump includes a bypass valve between an inlet and an outlet of the pump, wherein the bypass valve provides a leak between the inlet and the outlet when a pressure at the pump outlet exceeds a predetermined level, thereby preventing the pump from turning off due to the reaching of a cut-off pressure and maintaining the pressure at the outlet substantially constant.

3. The cooling system of claim 2, wherein the pump comprises a portable, DC pump.

4. The cooling system of claim 1, wherein the pump comprises a multi-chamber pump and thereby exhibits a generally non-pulsating flow of liquid to the nozzles.

5. The cooling system of claim 1, further comprising a flexible tubing for coupling the tank to the pump and the pump to the one or more nozzles.

6. The cooling system of claim 1, further comprising transporting means for facilitating a movement of the cooling system.

7. The cooling system of claim 6, wherein the transporting means comprises a cart having a plurality of wheels, wherein the cooling system is supported by the cart.

8. The cooling system of claim 6, further comprising a support post coupled to the transporting means for supporting the one or more nozzles at an elevated position.

9. The cooling system of claim 1, wherein the power source comprises one or more solar panels.

10. The kit of claim 2, wherein the tank and the pump are integrated together into a single unit, thereby decreasing the size of the kit and simplifying an installation of the kit on a vehicle or apparatus.

11. The kit of claim 2, wherein the pump comprises a multi-chamber pump and thereby exhibits a generally non-pulsating flow of liquid to the nozzles.

12. The cooling system of claim 1, further comprising:

a moveable cart for supporting the liquid storage tank, the pump and the power source thereon; and a support member having a bottom portion coupled to the cart and a top portion having a canopy structure coupled thereto, wherein the one or more nozzles are coupled to the canopy structure for providing the relatively fine mist in a region under the canopy structure.

13. The cooling system of claim 12, further comprising one or more solar panels coupled to the canopy structure and electrically coupled to the power source, wherein the one or more solar panels convert solar energy into electrical energy and deliver the electrical energy to the power source for supplemental power.

14. The cooling system of claim 2, further comprising:

a moveable cart for supporting the liquid storage tank, the pump and the power source thereon; and a support member having a bottom portion coupled to the cart and a top portion having a canopy structure coupled thereto, wherein the one or more nozzles are coupled to the canopy structure for providing the relatively fine mist in a region under the canopy structure.

15. The cooling system of claim 14, further comprising one or more solar panels coupled to the canopy structure and electrically coupled to the power source, wherein the one or more solar panels convert solar energy into electrical energy and deliver the electrical energy to the power source for supplemental power.

* * * * *